Sept. 4, 1962 W. W. DARLINGTON 3,052,858
ELECTROMAGNETIC MOTION RESPONSIVE DEVICE
Filed Nov. 3, 1958

INVENTOR.
WILLIAM W. DARLINGTON
BY
Christie, Parker & Hale
ATTORNEYS 3,052,858
ELECTROMAGNETIC MOTION RESPONSIVE DEVICE
William W. Darlington, Sherman Oaks, Calif., assignor to Edcliff Instruments, Inc., Duarte, Calif., a corporation of California
Filed Nov. 3, 1958, Ser. No. 771,591
5 Claims. (Cl. 336—30)

This invention relates to an electromagnetic motion responsive device and particularly to a differential transformer arrangement having two mechanically-coupled but magnetically-separated armatures.

Differential transformers are well-known electromechanical devices in which an alternating current voltage is produced responsive to displacement of a magnetic armature from a null position. By suitably coupling the magnetic armature to a mechanical component, differential transformers can be adapted to a wide number of control and measurement functions. While differential transformers having three and four windings in various configurations have been used in the past, such devices have employed windings formed on a single integral bobbin or spool and a single magnetic armature. The versatility of such differential transformers as applied to control and measurement functions is accordingly limited.

The present invention is a differential transformer comprising separate spaced-apart non-magnetic spools having central bores. First and second coils are formed on each of the spools respectively. Each coil consists of first and second wire windings. The first wire windings are electrically interconnected to form a transformer primary, and the second wire windings are electrically interconnected to form a transformer secondary. A non-magnetic mechanical coupling is adapted for axial movement of its opposite ends in the bores of the first and second spools respectively. Magnetically separate armatures are joined to opposite ends of the mechanical coupling. These armatures are positioned to occupy equal axial distances within the bores of the first and second spools respectively when the mechanical coupling is in a centered position between the spools.

By the use of two magnetically-separate but mechanically- coupled armatures, the spacing between the coils on the separate spools in the differential transformer of the present invention becomes unimportant. It, therefore, becomes possible to utilize the differential transformer in a variety of applications. Furthermore, the use of two separate spools in the transformer according to the present invention makes it unnecessary that the spools be axially aligned provided that suitable modification of the mechanical coupling is made. Accordingly, where the geometry of the application prevents axial alignment of the transformers, the advantages accruing through the use of differential transformers may still be achieved by utilization of the transformer of the invention.

Other advantages are accrued by reason of the utilization of four wire windings on separate spaced-apart spools coupled by magnetically-separate but mechanically-coupled armatures in the differential transformer of the invention. The device is economical in construction without sacrifice of sensitivity or stability. Each of the coils may be wound with standard winding techniques and capacitive effects may be readily eliminated by the use of electrostatic shields between each of the primaries and secondaries. As a result, any number of turns may be wound on the primary and secondary of either coil so that sensitivity can be controlled without the necessity for taps or switching of interconnections. A further advantage resulting from the separate coils of the transformer of the invention is that each coil may be separately encased in a housing of magnetic material, thereby increasing inductive coupling so that higher output voltages are obtainable responsive to minute movements of the magnetic armatures.

The differential transformer of the present invention may be adapted for use in numerous applications in automatic controls and instrumentation for dynamic measurements. It may be advantageously utilized wherever the magnitude of a displacement is to be measured. Accordingly, the differential transformer of the present invention may be used in electromechanical transducers to sense electrically the magnitude of mechanical displacements produced by variations of parameters such as acceleration, pressure, temperature, strain or the like. The transformer is particularly adaptable for use in an accelerometer embodying features such as those described in copending application, Serial No. 711,191, R. L. Pitzer and E. H. Rehnborg, filed January 27, 1958, and assigned to the same assignee as the present application. In combination with such a device, the feature of a non-magnetic coupling between two magnetically-separate armatures in the transformer of the present invention permits achievement of substantially constant damping action over a wide range of temperatures. Therefore, while the description of the utilization of the differential transformer of the present invention in an accelerometer embodying features described in the above-identified copending application should in no sense be construed as limiting its use to such an application, the device is described herein in combination with such an accelerometer to demonstrate its useful characteristics.

The advantages of the differential transformer of the present invention together with features of its operation will be better understood from the following description made in conjunction with the accompanying drawings in which.

Figure 1:
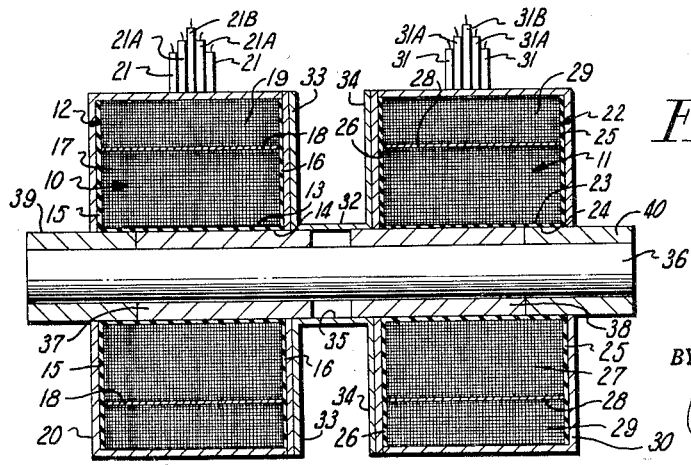
FIG. 1 is a longitudinal section of the differential transformer of the present invention.

With reference to FIG. 1, the differential transformer of the present invention comprises a first coil 10 and a second coil 11. The first coil is formed on a spool 12 of non-magnetic material such as a suitable plastic or rubber. The spool includes a cylindrical central section 13 provided with an axial bore 14 and radial end walls 15, 16 extending outwardly from the peripheries of opposite ends of the central section. A first wire winding 17 is wound in layers around the central section of the spool to form the primary of the first coil. An electrostatic shield 18 is overlaid on the first wire winding or primary. A second wire winding 19 is wound in layers over the electrostatic shield to form the secondary of the first coil, the electrostatic shield thereby being interposed between the first wire winding and second wire winding. A casing 20 of magnetic material such as mumetal encloses the spool and coil except for openings in the casing coinciding with the opposite ends of axial bore 14 of the spool. Electrical leads 21 from the primary, electrical leads 21A from the secondary of the first coil and electrical lead 21B to the electrostatic shield extend through casing 20. Lead 21B is employed in imposing an electrical potential upon the electrostatic shield.

Second coil 11 is formed identically in construction to first coil 10. The second coil is formed on a spool 22 including a cylindrical central section 23, an axial bore 24 in the central section, and radial end walls 25, 26 extending outwardly from the peripheries of opposite ends of the central section. A first wire winding 27 layered around the central section forms the primary of the second coil. An electrostatic shield 28 is overlaid on the primary. A second wire winding 29 overlying the electrostatic shield forms the secondary of the second coil. A casing 30 of magnetic material encloses the spool and second coil except for openings in the casing coinciding with the opposite ends of axial bore 24. Electrical leads 31 from the primary, electrical leads 31A from the secondary of the second coil, and electrical lead 31B to the electrostatic shield extend through casing 30. The leads from the primaries of the first and second coils and the leads from the secondaries of the first and second coils are electrically coupled so that they are combined to form one primary and one secondary.

In the embodiment shown in FIG. 1, casing 20 housing the first coil and casing 30 housing the second coil are joined by a spool-shaped connector 32. Radial end walls 33, 34 of the connector are joined to a face of casings 20 and 30 respectively, thereby interconnecting the casings housing the first and second coils. An axial bore 35 in the connector is aligned with axial bore 14 of spool 12 and axial bore 24 of spool 22 so that an axially-aligned combined bore is formed. A non-magnetic shaft 36 having a diameter substantially less than the diameter of the axial bore and a length substantially equal to the length of the combined axial bore is joined near its opposite ends to magnetic armatures 37, 38. Non-magnetic spacers 39, 40, formed from a material such as sintered tungsten, are joined to opposite ends of the shaft to provide a non-magnetic insulator between the end of each armature and an associated end of the shaft.

The diameter of each magnetic armature is such that it is slidable within its respective axial bore. Magnetic armature 37 is fitted in bore 14 of spool 12 and magnetic armature is fitted in bore 24 of spool 22. Shaft 36 therefore provides a non-magnetic mechanical coupling between the two magnetic armatures.

In operation, there is a centered position of the shaft where magnetic armatures 37 and 38 occupy the same proportions of the length of axial bores 14 and 24 respectively. In this position, the primary and secondary windings of coil 10 are magnetically coupled to the identical extent as the primary and secondary windings of coil 11. In this position, with the primaries of the two coils energized by an input voltage of A.C., a null output is developed from the secondaries. Movement of shaft 36 to either the left or right from the above-described null position induces an electrical output as the electromagnetic coupling of one coil will be increased and the electromagnetic coupling of the other coil will be decreased. It can be seen, therefore, that by coupling shaft 36 to a movable mechanical element responsive to a varying condition, movements of the mechanical element act to produce instantaneous electrical imbalances. The measurement of the magnitude of the resultant variations in electrical output provides a quantitative measurement of variations in the condition of interest.

Figure 2:
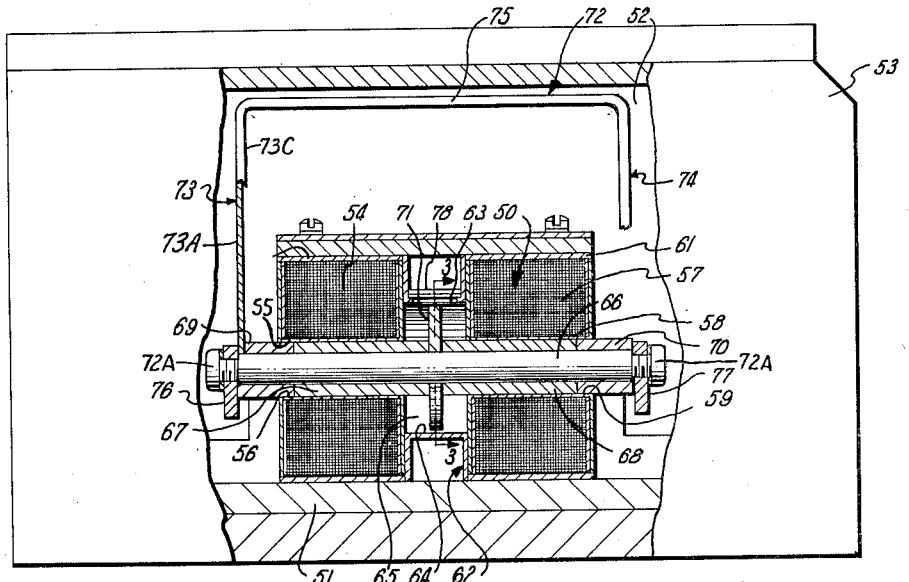
FIG. 2 is an elevation, partially broken away and sectioned, of an accelerometer embodying in combination the differential transformer of the present invention.
Figure 4:
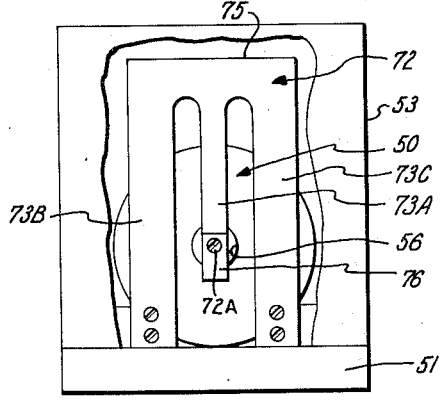
FIG. 4 is a side elevational view of the accelerometer of FIG. 2, broken away to show the main spring in greater detail.
Figure 3:
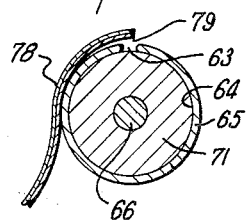
FIG. 3 is a fragmentary view generally taken along line 3—3 of FIG. 2.

The advantageous characteristics of the differential transformer of the present invention are particularly realized when it is embodied in an accelerometer wherein substantially constant damping action is achieved over a wide range of temperatures. With reference to FIGS. 2, 3 and 4, a differential transformer 50, substantially identical in construction to that described in FIG. 1, is mounted on a base 51 within an enclosure 52 formed between the base and a cover 53. The enclosure is fluid tight and is filled with a suitable damping liquid.

The differential transformer comprises a first coil 54 including a primary winding and a secondary winding formed around a spool 55 having an axial bore 56, and a second coil 57 including a primary winding and a secondary winding formed around a spool 58 having an axial bore 59. First coil 54 and second coil 57 are encased in magnetic housings 60, 61 respectively. The magnetic housings are joined by a connector 62 having a longitudinal slot or orifice 63 and an axial bore 64 formed in a cylindrical center section 65. The axial bores of coils 56 and 59 are axially aligned together with the axial bore of connector 64 so that a continuous coaxial bore is formed. However, axial bore 64 of the connector is larger in diameter than the diameter of the axial bores of the spools. A non-magnetic coupling shaft 66 fitted near its opposite longitudinal end with magnetic armatures 67, 68 extends through the length of the continuous coaxial bore. Armature 67 is associated with coil 54 and armature 68 is associated with coil 57. Non-magnetic spacers 69, 70 are fitted on opposite ends of the shaft to provide magnetic insulators. The shaft, therefore, provides a mechanical coupling between the magnetically separated armatures. Fitted on the portion of the shaft which passes through the axial bore of the connector is a dashpot piston 71, having a diameter such that it moves slidably within the enlarged bore of the connector and adjacent longitudinal slot 63.

A main spring 72 is joined as by screws 72A to the opposite ends of the coupling shaft. The main spring is formed from a single piece of flexible material to provide two parallel vertical spring members 73, 74 joined together at one end by a horizontal spring member 75. Two slots are made for a portion of the length of each vertical spring member so that each vertical spring member is divided into three strips. This is particularly shown in FIG. 4 where vertical spring member 73 is shown to comprise a middle strip 73A and two outer strips 73B, 73C. The middle strip of each vertical spring member is joined to the opposite ends of the coupling shaft while each of the outer strips is joined to a portion of the base. A weight 76 is joined to one end of the coupling shaft through the point where the shaft is fitted to middle strip 73A of vertical member 73 of the main spring and a weight 77 is correspondingly joined to the other end of the coupling shaft. Weights 76, 77 together with the coupling shaft and the associated armatures and spacers combine to form a mass which is displaceable responsive to the force of acceleration. The term "combined mass" as used herein shall refer to the combined weight of these components.

As particularly shown in FIG. 3, a bimetallic strip 78 is joined at one end to the base and is adapted to the curvature of connector 62 so that a part of it is disposed above longitudinal slot 63 in the connector. The width of the bimetallic strip is substantially equal to the length of the longitudinal slot. A variable orifice area or gap 79 is created between the bimetallic strip and the surface defining longitudinal slot 63 in the connector. The movement of the bimetallic strip responsive to changes in temperature of the damping fluid which, as previously described, fills enclosure 52 of the accelerometer varies orifice area 79. Therefore, in accordance with well-known principles of fluid dynamics, the ease with which damping fluid may be displaced from axial bore 64 of the connector through the orifice area and into enclosure 52 varies directly with the size of the orifice area. The bimetallic strip is adapted so that an increase in temperature of the damping fluid decreases the orifice area and a decrease in temperature of the damping fluid increases the orifice area.

In operation, the effect of acceleration is to cause a displacement of the combined mass so that the magnetic armatures are displaced from the null position. In this manner, the electrical imbalance, detected by any suitable electrical measurement circuit well-known to the art as an electrical output from the secondaries of coils 54 and 57, provides a quantitative measurement of the magnitude of the acceleration force. The system is particularly sensitive since it is capable of infinite resolution and results in increased accuracy by elimination of mechanical contacts in the electromagnetic displacement-sensing means.

The effect of acceleration in displacing the combined mass produces a longitudinal movement of the coupling shaft and, consequently, a displacement of dashpot piston 71 within axial bore 64 of the connector. At constant temperature, the force retarding movement of the dashpot piston remains constant, so that no change in damping action occurs. This is because orifice area 79 is constant in size and fluid friction, which varies with the viscosity of the damping fluid, is constant.

To provide constant damping action, it is required that the force retarding movements of the dashpot piston remain constant despite variations in temperature. Since changes in temperature change the viscosity of the damping fluid, and consequently, the effect of fluid friction, constant damping action is achieved by adjusting the size of the orifice area responsive to temperature variations. This is because each change in viscosity of the damping fluid induced by temperature changes is compensated by a properly compensating change in the orifice area. For example, as the temperature increases the viscosity of the damping fluid decreases. This reduces the magnitude of fluid friction and consequently the magnitude of the force retarding movements of the dashpot piston. To maintain constant damping action the retarding force upon the piston is made constant by decreasing the orifice area. As previously discussed, this increases resistance to flow of damping fluid out of the axial bore of the connector and therefore balances the decreased resistance to flow resulting from the reduced viscosity of the liquid. A constant damping action is thereby produced irrespective of temperature changes.

While not shown, an expansion pad may be fitted within enclosure 52 to compensate for expansion of the damping fluid due to temperature changes. The expansion pad may be any of those well-known to the art as, for example, a metallic element such as pressure capsule which is sufficiently resilient to expand and contract corresponding to such changes in the volume of the fluid.

It is apparent from the above description that the use of the mechanically-coupled but magnetically-separated armatures of the differential transformer of the present invention provides in combination an accelerometer having a constant damping action irrespective of temperature variations. This is achieved in addition to other intrinsic advantages of the transformer already described. This illustration of the advantages of the transformer of the present invention as applied to the measurement of acceleration is indicative of the advantages which can be accrued through other utilizations of the device.

I claim:

1. A differential transformer comprising separate spaced-apart first and second non-magnetic spools having central axial bores; first and second coils formed on the first and second spools respectively, each coil consisting of a first wire winding and a second wire winding concentric to the first winding; an electrostatic shield interposed between the first and second wire windings of each coil concentric to the axial bore; means for separately imposing an electrical potential on the electrostatic shields; means electrically interconnecting the first wire windings of each coil to form a transformer primary; means electrically interconnecting the second wire windings of each coil to form a transformer secondary; a non-magnetic mechanical coupling adapted for axial movement of its opposite ends in the bores of the first and second spools respectively; first and second magnetic armatures joined to opposite ends of the mechanical coupling and positioned to occupy equal axial portions within the bores of the first and second spools respectively when the mechanical coupling is in a centered position between the spools and separate spaced apart magnetic casings enclosing the first and second coils, respectively.

2. A differential transformer comprising separate spaced-apart first and second non-magnetic spools having axial bores; first and second coils formed on the first and second spools respectively, each coil consisting of separate first and second wire windings; an electrostatic shield interposed between the first and second wire windings of each coil; separate spaced apart magnetic casings enclosing the first spool and first coil and the second spool and second coil respectively, each magnetic casing having openings coinciding with the bore of the enclosed spool; a non-magnetic connector joining the two magnetic casings and having an axial bore, the bores of the spools and the bore of the connector being coaxially aligned to form a combined axial bore; a non-magnetic shaft disposed within the combined bore and adapted for longitudinal movement therein; first and second magnetic armatures joined to opposite ends of the shaft and slidably fitted within the bores of the first and second spool respectively, the armatures being positioned to occupy equal axial portions of their respective bores when the shaft is centered between the two spools; means electrically interconnecting the first wire windings of each coil to form a transformer primary; means electrically interconnecting the second wire windings of each coil to form a transformer secondary; and means for separately imposing an electrical potential on the electrostatic shields.

3. In an accelerometer the combination comprising a housing; a base joined to the housing to form a fluid-tight enclosure filled with a damping fluid; a differential transformer including first and second coils formed respectively on spaced-apart first and second spools having central axial bores, each coil consisting of first and second wire windings electrically interconnected to form a transformer primary and secondary respectively, magnetic casings separately enclosing each coil, each magnetic casing having openings coinciding with the bore of the enclosed spool, a connector joining the magnetic casings and having an axial bore and a longitudinal slot, the bores of the spools and the bore of the connector being coaxially aligned to form a combined axial bore, a magnetic armature slidably disposed within the bore of each spool, non-magnetic coupling means disposed within the combined bore and joined at opposite ends to the magnetic armatures, and fluid-displacing means joined to the coupling means and slidably fitted within the bore of the connector; spring means having elements joined to the ends of the coupling means for displacement of the coupling means responsive to an accelerating force; and temperature-responsive means associated with the longitudinal slot of the connector to define an orifice area for flow of damping fluid responsive to movements of the fluid-displacing means and adapted to vary said orifice area responsive to changes in temperature of the damping fluid.

4. Apparatus in accordance with claim 3 wherein the temperature-responsive means is a bimetallic strip joined at one end to the base and having a width substantially equal to the length of the longitudinal slot in the connector.

5. In a fluid damped transducer comprising a housing, a seismic mass movable in the housing, damping fluid in the housing, and a piston portion of the mass in the housing, the improvement residing in a temperature compensating means for the damping mechanism comprising an orifice communicating with the housing interior and exterior, and a bimetallic strip mounted adjacent the orifice to move toward and away from the orifice with temperature fluctuations and thereby to change directly the effective opening of the orifice.

References Cited in the file of this patent

UNITED STATES PATENTS

| | | |
|---|---|---|
| 2,277,499 | Missel | Mar. 24, 1942 |
| 2,318,271 | Weiche | May 4, 1943 |
| 2,332,994 | Draper | Oct. 26, 1943 |
| 2,430,757 | Conrad | Nov. 11, 1947 |
| 2,570,672 | Hathaway | Oct. 9, 1951 |
| 2,878,441 | Rogers | Mar. 17, 1959 |

FOREIGN PATENTS

| | | |
|---|---|---|
| 219,188 | Switzerland | May 1, 1942 |
| 472,991 | Great Britain | Oct. 4, 1937 |